May 14, 1940. H. H. POLK 2,200,994
VEHICLE JACK
Filed Dec. 18, 1939
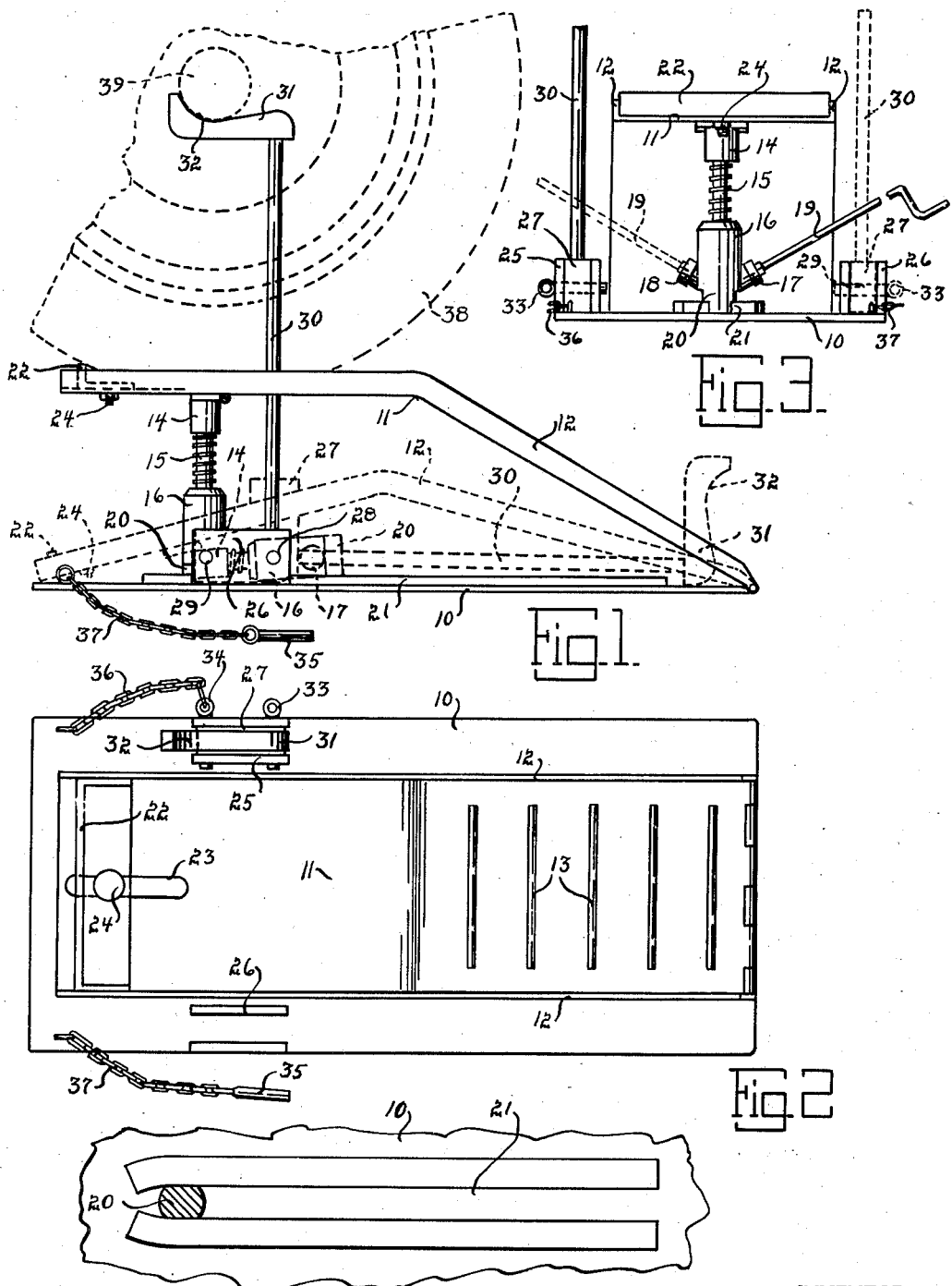
INVENTOR.
Harry H. Polk
BY M. Talbert L. Dick
ATTORNEY.

Patented May 14, 1940

2,200,994

UNITED STATES PATENT OFFICE 2,200,994

VEHICLE JACK

Harry H. Polk, Des Moines, Iowa

Application December 18, 1939, Serial No. 309,846

8 Claims. (Cl. 254—88)

The principal object of my invention is to provide an apparatus in one unit that may be used for quickly and easily accomplishing the elevation of a wheel of an automotive vehicle such as an automobile, truck, bus or like, and which will successfully hold the wheel in such raised position after its elevation from a normal position has been accomplished.

More specifically, the object of this invention is to provide in combination a collapsible ramp for use in getting the wheel into a raised condition and a supporting jack means for holding the wheel in such an elevated position after the ramp has been collapsed.

A still further object of this invention is to provide a vehicle jack having thereon an adadjustable chock for accommodating various sizes of vehicular wheels and one wherein the supporting jack does not have to be operated against the weight of the vehicle.

A still further object of this invention is to provide a vehicle jack that is economical in manufacture, durable in use, easily and quickly operated, and when in a folded condition occupies a minimum amount of space.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my complete device ready for use, showing by dotted lines the position of a vehicle wheel and axle and also the combination ramp and jack when in a folded position.

Fig. 2 is a top plan view of my vehicle jack.

Fig. 3 is a front end view of my device with the ramp portion elevated and in position for the vehicle to be run upon it.

Fig. 4 is a top plan view of a portion of the base of the device, showing the jack guide tracks.

The usual method of raising the wheel of an automotive vehicle to an elevated position for the changing or repairing of a tire or like is by the use of a manually operated jack which must be inserted under the car frame or axle. Such lifts are either operated by a cranking lever or by a pumping lever and the entire weight of the vehicle must be lifted a considerable distance. This is an extremely and especially arduous task with the modern low-hung automotive vehicles and such jacks usually do not have a stable supporting surface for permitting them to be easily used in soft or uneven ground. I have overcome such objections as will be appreciated and as will be hereinafter more fully set forth.

Referring to the drawing, I have used the numeral 10 to designate the base portion of my device. This base portion may be made of any suitable material such as sheet metal and is designed to rest on the ground or other supporting surface. Due to the substantial area of the flat base 10, my device provides a stable support and will not tip or rock during its use. I have used the numeral 11 to designate the ramp portion of my device. This ramp portion has one of its ends hingedly secured at one of the ends of the base 10 as shown in Fig. 1 of the drawing. The numeral 12 designates vertically extending side walls on the two parallel marginal side edges of the ramp. This ramp 11 extends, when in an elevated position, from its pivot point on the base 10 upwardly and over the base 10 at an angle thereto and then horizontally, as shown in Fig. 1 of the drawing.

The numeral 13 designates a plurality of ridges formed in the ramp 11 for strengthening the ramp and also serving the purpose of permitting greater traction of the wheel running upwardly upon it. The numeral 14 designates a jack hingedly secured to the lower surface of the ramp 11 below the horizontal portion thereof and capable of folding between the ramp 11 and the base 10 when the device is in a collapsed or folded position. This jack 14 has the ordinary screw threads 15 and the base portion 16. The numerals 17 and 18 designate two operating sockets in conjunction with the base 16 for elevating or lowering the jack 14. The numeral 19 indicates an elongated operating handle capable of operatively engaging the socket members 17 or 18 for operating the jack 14. The lower portion of the base 16 has its sides flattened and this portion of the jack I have designated by the numeral 20. The numeral 21 indicates a guide track rigidly secured to the base 10 in its approximate center and running longitudinally thereto. This track 21 is formed by two strips of parallel material having their forward ends brought together and it is within this track 21 that the flattened base portion 20 of the jack 14 rests. Thus when the jack is pivoted so that the ramp 11 is in its raised position, the base portion 20 of the jack 14 will ride between rails and in the track 21 until it has reached the restricted portion of the track 21 at which time the jack will be in a vertical position. Positioned on the forward end of the ramp 11 is a wheel stop or chock 22. The numeral 23 designates a slot cut in the ramp 11, extending parallel to the longitudinal length of the ramp 11 and as is shown in Fig. 2 of the drawing. The numeral 24 designates a bolt and nut having the head portion sunk into the top portion of the chock 22 extending through the slot 23 and tightening on the bottom side of the ramp 11 for permitting the chock to be adjustably moved to various places within the ramp 11, dependent upon the size of the wheel of the vehicle. The numeral 25 designates a bracket formed on the base member 10 to one side of the ramp 11. The numeral 26 indicates a bracket formed on the base member 10 on the other side of the ramp 11 to which is hingedly secured a support or jack which I will now describe. The numeral 27 indicates a block portion having two spaced apart holes therethrough for registration with holes 28 and 29 cut through the brackets 25 and 26. The numeral 30 indicates an elongated shaft or arm having one of its ends secured to the block 27 and having upon its other end an axle supporting element 31. This axle supporting element extends parallel to the block 27 and protrudes in the same direction from the arm 30 as does the block 27 and has its upper surface formed into a holding notch 32, as shown in the drawing. I have used the numeral 33 to indicate a removable pin capable of being inserted through the holes 28 of either of the brackets 25 or 26 for pivotally securing the block 27 thereto. The numerals 34 and 35 indicate pins capable of engaging the holes 29 and the block 27 for preventing its pivoting movement on the pin 33 at times. These pins 34 and 35 are prevented from accidental loss by being chained through the medium of the chains 36 and 37 to the base 10. Obviously two pins 33 may be used and they may also be secured to the base 10 by a flexible means. Thus the block 27 may be placed in either the bracket 25 or the bracket 26, dependent upon which side of the vehicle the device is to be used. The numeral 38 designates the wheel and tire of an automotive vehicle, and the numeral 39 indicates the axle to which the wheel is attached and as is shown by dotted lines in Fig. 1.

The practical operation of my device is as follows:

The ramp and jack would ordinarily be in the position shown by dotted lines in Fig. 1. When it is desired to use the jack for changing the wheel or repairing a tire on a vehicle, the ramp is brought to its raised position so that the jack 14 is vertical and so that the base 20 of the jack is stopped by the restricted ends of the guide track 21. If the tire to be fixed is on the right side of the vehicle, the block 27 may be placed within the bracket 26 and the pin 33 inserted through the hole 28 and the block 27. If the tire to be changed is on the left side of the vehicle, the block 27 may be placed in the bracket 25 and the pin inserted through the holes therein for pivotally securing the block 27 to this bracket. The handle 19 is then inserted in the socket 17 or 18 as the case may be, and upon whichever side is to be toward the outside of the vehicle, and the jack 14 is then raised to such a height as to permit the arm 30 and lug or axle supporting element 31 to clear the axle 39 of a vehicle. The vehicle is then run up onto the ramp 11 until it reaches the preset chock or stop 22. The block 27 with the attendant arm 30 and axle supporting member 31 is then pivoted so that the axle supporting member 31 is directly below the axle 39 and the pin 34 or the pin 35, dependent upon which side is used, is then inserted through the holes 29 and through the block 27, thus preventing the pivoting movement of the block 27. All that is then necessary is that the jack 14 be lowered until the axle 39 rests upon the axle support 31 and within the notch portion 32. The jack 14 may then be pivoted rearwardly and the ramp collapsed to the position shown by dotted lines in Fig. 1, with the rod 30 remaining in a vertical position for supporting the wheel. As the axle is supported at a point a distance from the rod 30, there is no danger of this axle support collapsing even without the pin 34 and 35 being inserted, but when the device is used on a hill or other surfaces that are not level, it is advisable to use these pins 34 and 35 to increase the safety of the jack. Once the chock 22 has been set to conform to the size of a given wheel, the nut 24 is tightened and this block is left permanently in one position. When it is desired to remove the jack from the wheel and from the axle 39, this may be accomplished by two methods. First the pin 34 or 35 may be removed, dependent upon which bracket the jack portion is mounted in, and the car may be backed from the jack. As the jack portion pivots rearwardly and downwardly, the wheel will travel down the ramp 11 even when the ramp is in a lowered position, thus disengaging the jack from the wheel and axle of the vehicle.

Secondly, the ramp may be raised with the base of the jack within the track 21 after which the jack may be operated for raising the wheel to such a position that the axle support 31 is out of engagement with the axle 39, the arm 30, and axle support 31 may be pivoted to its lower position as shown by dotted lines in Fig. 1 and the vehicle backed up so as to cause the wheel 38 to run down the ramp 11, thus freeing the ramp and jack from the vehicle.

Thus it will be seen that I have provided a vehicle jack which fulfills all of my objects and which presents many more obvious advantages. Little effort is required to place the device in an operative position, and the device may be used in such a manner that it is never necessary to manually raise the weight of the vehicle. My jack is versatile in its uses, is simple in its operation, safe, fool-proof, and folds to a compact form.

Furthermore, it is light in weight, is adaptable to all types of vehicles and to all conditions likely to be encountered and provides a stable supporting base and structure.

Some changes may be made in the construction and arrangement of my improved vehicle jack without departing from the real spirit and purpose of my invention, and it is my intention to cover by my claims any modified forms of structure or use of mechanical equivalents which may be reasonably included within their scope.

I claim:

1. In a device of the class described, a base member, a ramp hinged at one end to said base member, a lowerable and raisable jack under the free end portion of said ramp capable of lowering and holding and raising and holding the free end of said ramp at any position in its normal effective swinging movement relative to said base, and a supporting member on said base member.

2. In a device of the class described, a base member, a ramp hinged at one end to said base member, a lowerable and raisable jack hinged to the free end portion of said ramp capable of lowering and holding and raising and holding the free end of said ramp at any position in its normal effective swinging movement relative to said base, and a supporting member on said base member.

3. In a device of the class described, a base member, a ramp hinged at one end to said base member, a lowerable and raisable jack under the free end portion of said ramp capable of lowering and holding and raising and holding the free end of said ramp at any position in its normal effective swinging movement relative to said base, and a supporting member hingedly secured on said base member.

4. In a device of the class described, a base member, a ramp hinged at one end to said base member, a lowerable and raisable jack hinged to the free end portion of said ramp, a supporting member on said base member, and a track on said base member designed to be engaged by the lower end portion of said jack at times.

5. In a device of the class described, a base member, a collapsible ramp on said base member upwardly extending flanges on the side marginal edges of said ramp, a stop bar element slidably adjustably mounted on the upper end portion of said ramp.

6. In a device of the class described, a base member, a ramp hinged at one end to said base member, a lowerable and raisable jack under the free end portion of said ramp, a supporting member hingedly secured on said base member, and a means for rigidly holding said supporting member against movement at times.

7. In a device of the class described, a base member, a ramp element hinged at one end to said base member, and a jack mechanism between the said base member and the free end portion of said ramp, capable of lowering and holding or raising and holding the free end of said ramp at any position in its normal effective swinging movement relative to said base.

8. In a device of the class described, a base member, a ramp hinged at one end to said base member, a lowerable and raisable jack hinged to the free end portion of said ramp, and a track on said base member designed to be engaged by the lower end portion of said jack at times.

HARRY H. POLK.